United States Patent [19]

Jerue

[11] 3,823,642

[45] July 16, 1974

[54] POWER DRAW BOLT

[75] Inventor: Richard A. Jerue, Birmingham, Mich.

[73] Assignee: Devlieg Machine Company, Royal Oak, Mich.

[22] Filed: Sept. 1, 1972

[21] Appl. No.: 285,605

[52] U.S. Cl. .............................. 90/11 D, 408/239 A
[51] Int. Cl. ............................................ B23q 3/12
[58] Field of Search .......... 90/11 D, 11 A; 29/26 A, 29/568; 408/239 A

[56] References Cited
UNITED STATES PATENTS

| | | | |
|---|---|---|---|
| 2,885,930 | 5/1959 | Adams | 90/11 D |
| 2,924,152 | 2/1960 | Zettler | 408/239 A X |
| 3,311,024 | 3/1967 | Daugherty | 90/11 D |
| 3,374,711 | 3/1968 | Saunders | 90/11 D |
| 3,520,228 | 7/1970 | Wohlfeil | 90/11 A |
| 3,613,192 | 10/1971 | Tanabe et al. | 90/11 A X |
| 3,615,100 | 10/1971 | Banner | 90/11 A |
| 3,633,457 | 1/1972 | Reeber et al. | 90/11 D |

Primary Examiner—Andrew R. Juhasz
Assistant Examiner—Z. R. Bilinsky
Attorney, Agent, or Firm—Harness, Dickey & Pierce

[57] ABSTRACT

A machine tool drive spindle has a socket in which tools are interchangeably seated for the performance of various metal cutting operations. A draw bolt within the drive spindle is threadable into the rear end of a tool to hold it in the socket. In order to secure a tool in the spindle socket, the draw bolt is first rotated by a hydraulic motor to threadably engage the tool and seat it in the socket. Thereafter, a clutch between the hydraulic motor and the draw bolt is disengaged and a substantial axial pulling force is applied to the draw bolt to hold the tool against its seat with a predetermined clamp load.

12 Claims, 5 Drawing Figures

POWER DRAW BOLT

SUMMARY OF THE INVENTION

Power draw bolts are customarily employed in a wide variety of machine tools for securing a tool or tool holder in the drive spindle of the machine. The draw bolt consists of an elongated shaft or rod having threads at its forward end which project into the spindle. Various devices have been utilized for rotating and tensioning the draw bolt to hold the tool against its seat with a strong seating force. The majority of such devices have attempted to achieve the desired seating force by the rotation of the draw bolt. In contrast to such prior devices the structure of the present invention utilizes rotation of the draw bolt only to produce threaded engagement of the draw bolt with the tool and to lightly seat the tool within the socket. Thereafter, a solely axial force is applied to the draw bolt to produce a predetermined elongation thereof. This predetermined elongation of the draw bolt will hold the tool against its seat with a predetermined clamp load. The predetermined elongation of the draw bolt is achieved through the movement of a mechanical wedge actuator. Torque is known to be a poor measure of clamp load and the device of the present invention totally eliminates torque from the clamp load producing mechanism, substituting therefor a measured elongation of the draw bolt. Accordingly the device of the present invention possesses a high degree of uniformity and reliability in the tool clamp load which is achieved.

The draw bolt of the present invention has further advantages in minimizing the wear between the threads of the draw bolt and the threads of the tool, in simplifying the controls for the actuation and release of the clamp load producing force, in monitoring the positions of the clamp load producing mechanism and in its simplicity of construction, durability and light weight. The device of the present invention further eliminates the presence of residual torque within the draw bolt during the performance of a cutting operation. Thus, any forces which would permit the draw bolt to relieve such torque by rotation during the machining operation are eliminated. The draw bolt of the present invention is further distinguished by its self-locking characteristics in which the clamp load is maintained on the tool without the necessity of continuously applying hydraulic pressure or other clamp load producing forces through a rotating coupling.

DESCRIPTION OF THE DRAWINGS

FIG. 5 is a reduced scale sectional view of the structure illustrated in FIG. 2 taken along the line 5—5 thereof.

DETAILED DESCRIPTION OF THE PREFERRED EMBODIMENT

Figure 1:
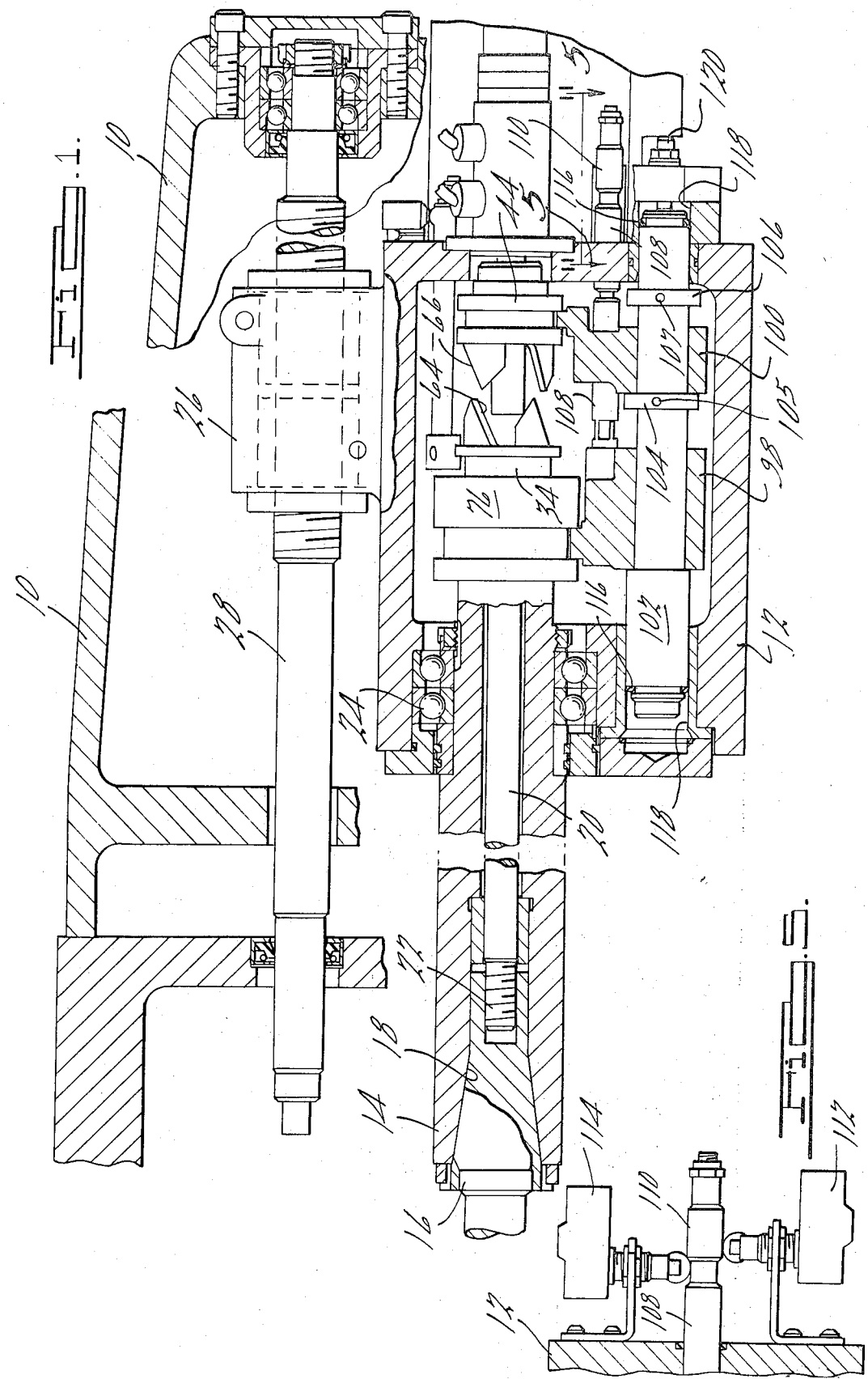
FIG. 1 is a broken longitudinal sectional view of a machine tool spindle, draw bolt and related mechanism embodying the principles of the present invention.

Referring now to FIG. 1, the illustrated structure includes a spindle head 10 in which a spindle 14 is slidably supported by means of bearings (not shown). The rear end of the spindle 14 is supported on a spindle thrust housing 12 while the forward end of the spindle carries a cutting tool 16 in a tool socket 18 thereof. A draw bolt 20 is rotatably and axially slidable within the spindle 14 and is provided with a threaded forward end 22 extending into the socket 18. Thrust bearings 24 are shown positioned between the spindle 14 and the spindle thrust housing 12 by which axial movement of the thrust housing 12 is transmitted to the spindle. This movement is achieved by means of a nut 26 formed integrally on the spindle housing 12 and through which a lead screw 28 is threaded. The lead screw 28 is journalled within the spindle head 10 and its rotation is operable to advance the spindle thrust housing 12 and spindle 14 in a direction parallel to the axis of rotation of the spindle 14. Spindle rotation is accomplished through a conventional quill (not shown).

Figure 2:
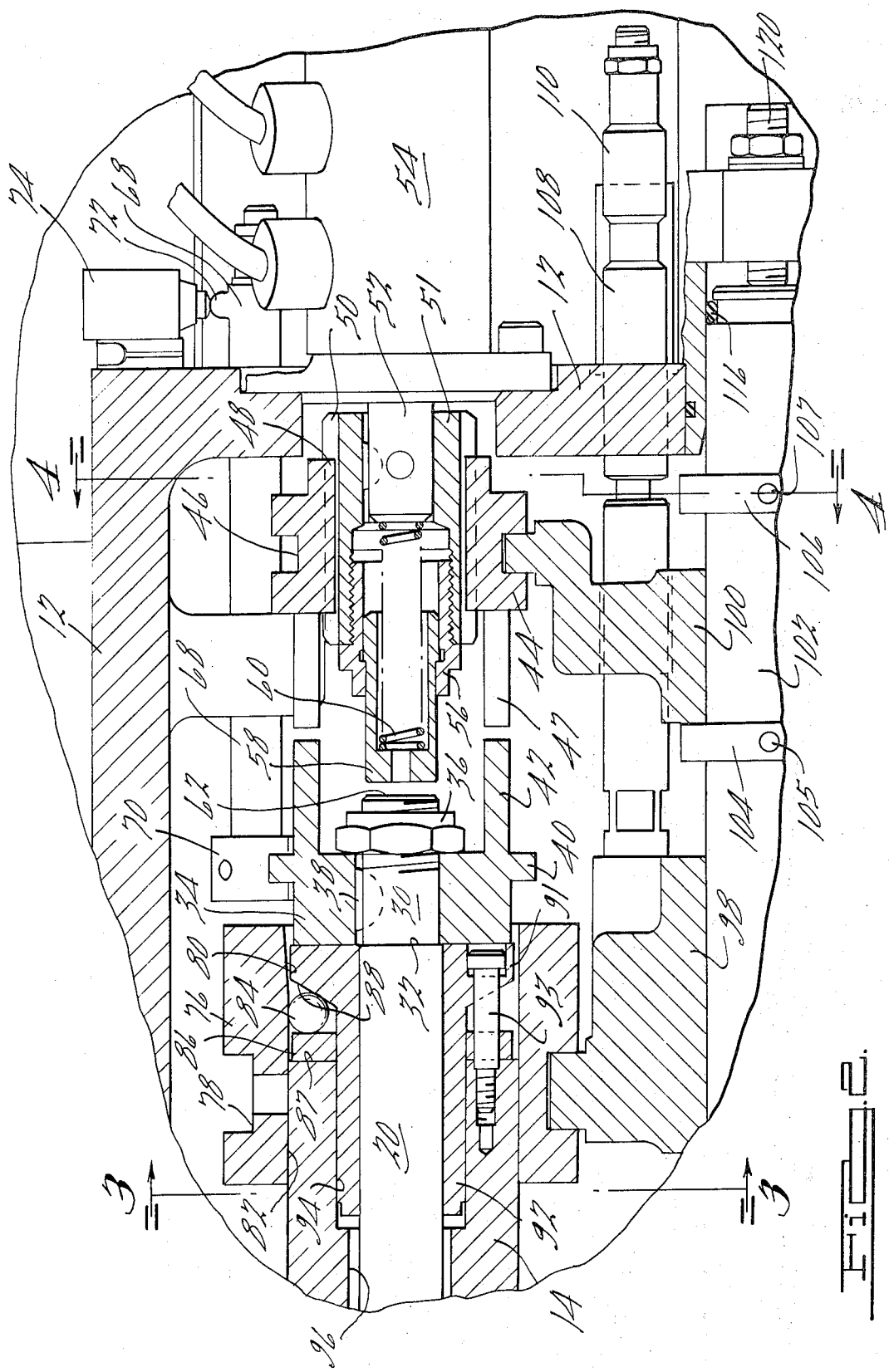
FIG. 2 is an enlarged sectional view of a portion of the structure illustrated in FIG. 1.
Figure 3:
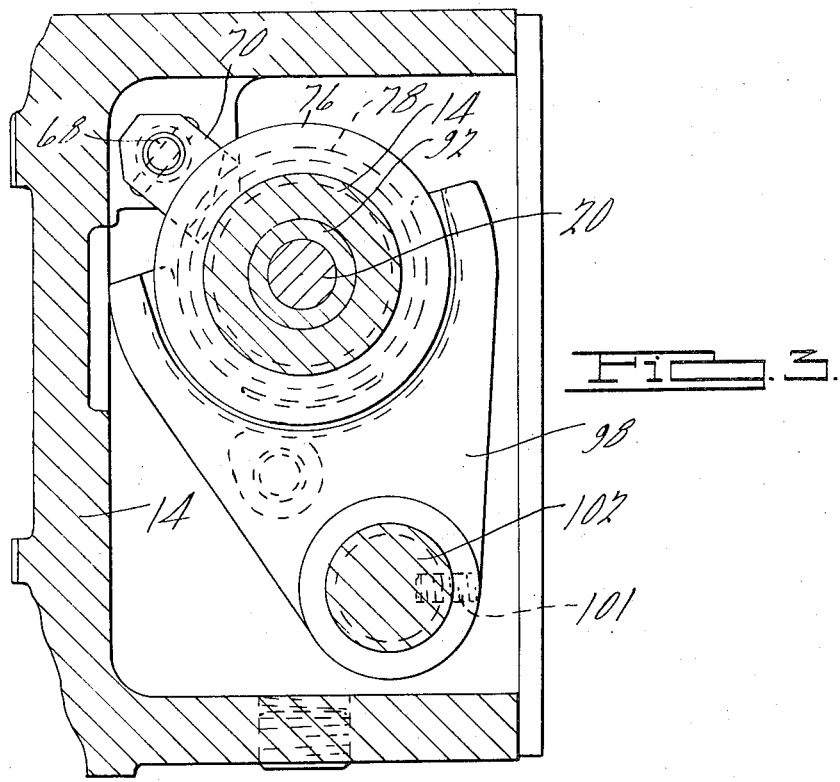
FIG. 3 is a sectional view of the structure illustrated in FIG. 2 taken along the line 3—3 thereof.
Figure 4:
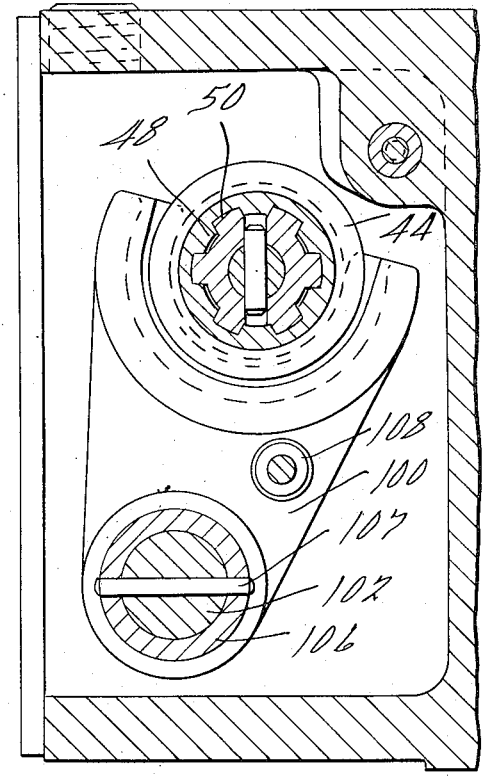
FIG. 4 is a sectional view of the structure illustrated in FIG. 2 taken along the line 4—4 thereof.

Turning now to the draw bolt 20 and to FIG. 2, it will be seen that the draw bolt has a reduced diameter end portion 30 emanating from an annular shoulder 32 and serving to mount a clutch member 34. A nut 36 is threaded on to the draw bolt end 30 and holds the clutch member 34 against the annular shoulder 32. The draw bolt 20 and the parts carried thereby are freely movable within the spindle 14 both in an axial direction and rotatably. Rotation of the clutch member 34 is transmitted to the draw bolt 20 by a key 38 carried by the clutch member 34 and received in the draw bolt end 30. The clutch member 34 is provided with a radially outwardly extending annular shoulder 40 and with circumferentially spaced axially projecting clutch teeth 42 on the rearward side thereof. The clutch teeth 42 mate with the clutch teeth 47 of a second clutch member 44. The mating clutch members 34 and 44 are arranged coaxially with the draw bolt 20 and spindle 14 and are rotatable about the axis thereof. The second clutch member 44 has an annular groove 46 formed around its outer periphery and a plurality of splines 48 formed on its inner periphery. The splines 48 mesh with the splined grooves 50 of an adaptor 51 which is generally sleeved-shaped and is keyed to the drive shaft 52 of a hydraulic drive motor 54. Thus, the second clutch member 44 is free to slide axially on the adaptor 51 but is rotatably coupled to the drive motor 54.

A bushing 56 is threaded into the forward end of the adaptor 51 and serves to guide a plunger 58 for axial movement. The plunger 58 is biased in a forward axial direction by means of a spring 60. The plunger 58 is engageable with the rear end 62 of the draw bolt 20 to hold the threaded end 22 of the draw bolt against the threads of a tool 16 when a new tool is first inserted in the socket 18. As illustrated in FIG. 1, the clutch members 34 and 44 have mating drive teeth 64 and 66. An indicating arm 68 is supported by the thrust housing 12 for movement parallel to the spindle axis and carries a fork member 70 at its forward end embracing the flange 40 of the clutch member 34. This arrangement is such that flange 40 can rotate freely within the fork member 70. However, axial movement of the clutch member 34 will cause axial movement of the fork member 70 and the arm 68 on which it is positioned. When the draw bolt 20 is in its fully forward position as illustrated in FIG. 2, a detent 72 on the arm 68 will actuate a limit switch 74 to indicate the presence of the draw bolt 20 in this fully forward position.

The mechanism for applying a clamp load to the draw bolt 20 includes a conical wedge actuating ring 76 having an annular groove 78 formed in its outer periphery. The inner periphery of the ring 76 includes an inner conical surface 80 at the right hand end thereof merging with a straight inner cylindrical surface 82 extending to the left hand end of the ring 76. The inner surfaces 80 and 82 surround a circumferential array of balls 84 which abut a thrust washer 86 on their forward sides and an inclined conical wedge surface 88 on their rear sides. The conical wedge surface 88 is formed on an annular flange 91 of a generally sleeve-shaped abutment member 92. The abutment member 92 abuts the clutch member 34 at its rear end and attempted rearward movement of the abutment member 92 is transmitted to the draw bolt 20 through the clutch member 34 and the nut 36. As viewed in longitudinal section, the conical wedge surface 88 makes an acute angle with a radius emanating from the spindle axis. Forward movement of the abutment member 92 from the position illustrated in FIG. 2 is possible due to the sliding fit of the abutment member in a counterbore 94 formed in the rear end of a bore 96 of the spindle 14. The bore 96 extends the entire length of the spindle 14 to accommodate the draw bolt 20. As illustrated in FIG. 2, the actuator ring 76 has been shifted to its full rearward position so that the balls 84 are confined within the straight cylindrical wall 82 of the ring 76. In this position the balls 84 have been biased radially inwardly to produce a rearward movement of the abutment member 92 relative to the spindle 14. The abutment member 92 is held on the spindle 14 by three circumferentially spaced screws 93 which are dimensioned to permit the necessary axial movement of the abutment member 92.

Axial movement of the actuator ring 76 is accomplished by a shifter fork 98 engageable in the groove 78 and positioned on a shifter rod 102. A second shifter fork 100 is engageable in the groove 46 of the second clutch member 44 and is also mounted on the shifter rod 102. A pair of abutment rings 104 and 106 are positioned on the shifter rod 102 on opposite sides of the shifter fork 100. The shifter fork 98 is fixed on the shifter rod 102 by a pin 101, while the collars 104 and 106 are fixed on the shifter rod 102 by pins 105 and 107. The shifter fork 100 is slidable on the shifter rod 102 between the collars 104 and 106. An indicator rod 108 is fixed to the shifter fork 98, passes freely through the shifter fork 100 and is slidably guided in the thrust housing 12. A land 110 on the rod 108 actuates a pair of limit switches 112 and 114 fastened to the housing 12. The limit switch 112 will be actuated when the shifter rod 102 is in its fully retracted position while the limit switch 114 will be actuated as soon as the shifter rod 102 has started its forward travel. The limit switch 112 will be deactivated when the shifter rod 102 is in its fully forward position. The opposite ends of the actuator rod 102 are fitted with seals 116 and are disposed within fixed cylinders 118. Thus, alternate pressurization of the cylinders 118 is operable to shift the rod 102 to either an extreme forward or an extreme rearward position, the extreme rearward position of the actuator rod being controllable by a threaded stop member 120.

OPERATION

As illustrated in FIGS. 1 and 2, the device is in a position holding a tool 16 firmly seated in the socket 18. In order to release the tool, the shifter rod 102 is fully shifted forward by hydraulic pressure. This has the result of positioning the wide diameter end of the conical inner surface 80 over the balls 84. This will permit the abutment member 92 to move to the left forcing the balls 84 radially outwardly. This releases substantially all of the axial load on the tool 16. As the shifter member 102 moves forward the collar 106 will abut the shifter fork 100 moving the shifter fork 100 forward and bringing the clutch member 44 into engagement with the clutch 34. The hydraulic motor 54 is then operated in a reverse direction to disengage the threaded end 22 of the draw bolt 20 from the tool 16. The tool 16 may then be removed from the socket 18. When a new tool is inserted into the socket 18 the threaded end 22 of the draw bolt 20 will be held in engagement with the threaded rear end of the tool 16 by the spring biased plunger 58. The hydraulic motor 54 is then operated in a forward direction to rotate the draw bolt into full threaded engagement with the tool 16, this rotary force being transmitted through the clutch members 44 and 34. As the draw bolt 20 threads its way into the tool 16 it moves forwardly carrying the fork 70 and its indicating rod 62 with it. The draw bolt 20 keeps rotating until it is "finger tight" in the tool 16. At that point the hydraulic motor 54, which is relatively weak, stalls out. As the draw bolt 20 reached the full forward extent of its movement, the detent 72 will actuate the limit switch 74. A short time delay thereafter (to assure full forward rotation of the draw bolt) suitable hydraulic valves (not shown) are actuated to move the shifter rod 102 to the rear (right in FIG. 2) in order to disengage the clutch members 34 and 44 and move the conical wedge actuating ring 76 rearwardly. This righthand or rearward movement of the actuating ring 76 biases the balls 84 radially inwardly. Inasmuch as the balls are held against forward movement relative to the spindle 14 by the thrust washer 86 they apply a rearward biasing force to the inclined conical surface 88 of the abutment member 92, thereby forcing the abutment member 92 to the rear and elongating the draw bolt 20.

It will be appreciated that the dimensions of the conical surface 80, the conical wedge surface 88, the balls 84 and the space between the washer 86 and the conical surface 88 may be so dimensioned as to shift the abutment member 92 a predetermined distance to the rear. This will have the effect of achieving a precise elongation of the draw bolt 20. A predetermined elongation of a shaft-like member of a given diameter and length and of a known material will apply a predetermined tensile loading to that member. Thus, the dimensions in one exemplary embodiment of the present invention have been set to apply a 4,300 pound tensile loading to the draw bolt 20. This clamp load was achieved by the 0.020 inch elongation of a steel draw bolt which was 51-7/16 inches long and 0.800 inch in diameter for most of its length.

It should be noted that the hydraulic motor 54 only lightly seats the tool 16 in the socket 18 and stalls out without torquing the draw bolt to any appreciated degree. This results from the fact that the hydraulic motor 54 is relatively weak, far too weak to produce the necessary seating force on the tool for accurate machining. Thus the hydraulic motor 54 may be said to achieve only light seating engagement of the tool 16 in its socket 18.

From the foregoing it will be apparent that the draw bolt actuating mechanism of the present invention undergoes a two step operation. First the draw bolt is threaded into the tool to seat the tool lightly in its socket. Secondly a conical wedge mechanism is actuated to produce a predetermined elongation of the draw bolt and, therefore, a predetermined clamp load on the tool.

I claim:

1. In a machine tool having a rotary drive spindle provided with a tool receiving socket at its forward end, the combination which includes a draw bolt positioned coaxially within said spindle and supported for rotation relative thereto, said draw bolt having a threaded end portion disposed in said socket, torque sensitive low power means for rotating said draw bolt into threaded engagement with a tool positioned in said socket and lightly seating a tool in said socket, said low power means being effective to discontinue its operation in response to the attainment of a predetermined low torsional loading of said draw bolt and without imparting a substantial tensile load to said draw bolt and high power means operable subsequent to said low power means for producing a predetermined rearward movement of the rear end of said draw bolt without torsionally loading said draw bolt.

2. The structure set forth in claim 1 in which said low power means comprises a hydraulic motor which is operable to stall after the seating of a tool in said socket.

3. The structure set forth in claim 1 in which said high power means comprises mechanical wedge means.

4. The structure set forth in claim 1 in which said high power means includes a conical wedge actuating ring.

5. The structure set forth in claim 1 in which said low power means comprises a hydraulic motor and in which said high power means comprises a mechanical wedge device.

6. The structure set forth in claim 1 including a clutch between said low power means and said draw bolt and means for disengaging said clutch prior to the delivery of all of the power of said high power means to said draw bolt.

7. The structure set forth in claim 6 including common means for disengaging said clutch and connecting said high power means to said draw bolt.

8. In a machine tool having a rotary drive spindle provided with a tool receiving socket at its forward end the combination which includes a draw bolt positioned coaxially within said spindle and supported for rotation and axial movement relative thereto, said draw bolt having a threaded end portion disposed in said socket, rotary power means for rotating said draw bolt into engagement with a tool positioned in said socket and causing said tool to be seated in said socket and pulling means for delivering a substantial axial pulling force to said draw bolt after a tool is seated in said socket, said pulling means comprising an abutment member positioned on said draw bolt and having a frustoconical shoulder, a plurality of balls positioned about said shoulder, and a sleeve surroundingly engaging said balls and having an internal conical wedge surface which is operable to bias said balls in a radially inward direction upon movement of said sleeve in a given direction and power operated means for biasing said sleeve in said given direction and thereby causing said balls to bias said abutment member in said given direction and thereby elongate said draw bolt whereby a tool into which said draw bolt is threaded will be forcibly held against its seat by said draw bolt.

9. The structure set forth in claim 8 including a shifter member axially coupled to said sleeve in a manner permitting rotation of said sleeve relative thereto and hydraulic means for moving said shifter member in an axial direction.

10. The structure set forth in claim 8 in which said sleeve is provided with a straight cylindrical portion into which said balls are movable at the end of movement of said sleeve whereby said sleeve is operable to hold said balls in a radial inward position without the application of substantial axial force thereto.

11. The structure set forth in claim 8 including a first clutch member carried by said draw bolt and co-rotatably coupled thereto and a second clutch member co-rotatably coupled to said rotary power means, said second clutch member being axially movable with respect to said rotary power means, a first shifter member axially coupled to said sleeve and a second shifter member axially coupled to said second clutch member and actuating means connected to both of said shifter members for simultaneously operating said shifter members, movement of said shifter members in one direction being operable to disengage said first and second clutch members and actuate said abutment member to apply a tensile loading to said draw bolt.

12. The structure set forth in claim 11 including limit switch means for sensing the position of at least one of said shifter members.

* * * * *